J. T. Coupier & M. A. C. Mellier.
Pulp Digester.
No. 1,295. Reissued Mar. 25, 1862.
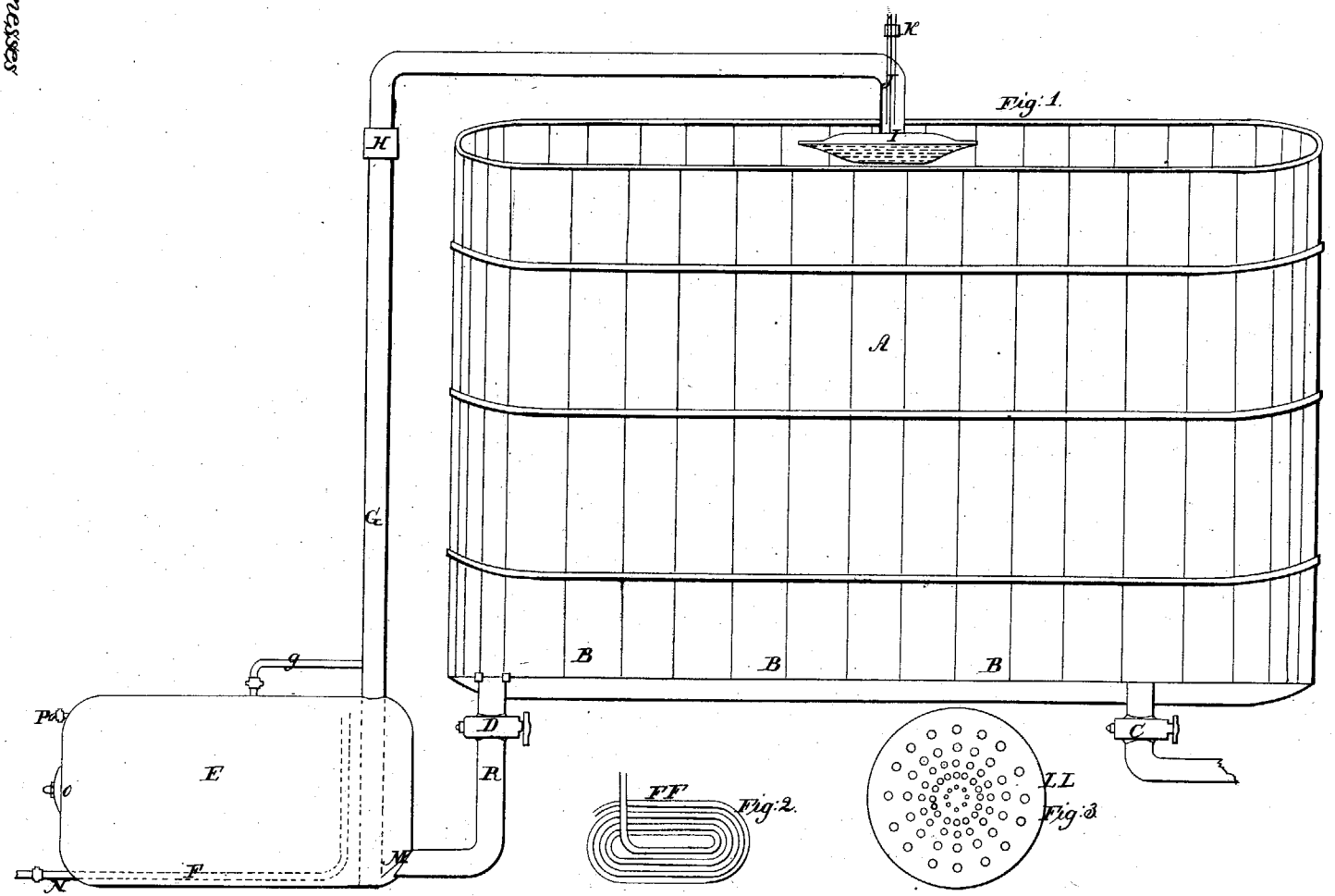
Witnesses
E. J. Gale
Inventor;
C. S. Buchanan

UNITED STATES PATENT OFFICE.

COE S. BUCHANAN, OF NEW YORK, N. Y., ASSIGNEE OF JEAN THEODORE COUPIER AND M. A. C. MELLIER, OF PARIS, FRANCE.

IMPROVEMENT IN THE PREPARATION OF PAPER-STUFF.

Specification forming part of Letters Patent No. 9,910, dated May 7, 1851; Reissue No. 1,295, dated March 25, 1862.

*To all whom it may concern:*

Be it known that JEAN THEODORE COUPIER and MARIE AMEDEE CHAS. MELLIER, of Paris, France, have invented a new and improved method of reducing fibrous vegetable substances to pulp fit for the purpose of manufacturing white paper; and the following is a full and sufficient description thereof, reference being had to the accompanying drawing and reference-letters marked thereon, making a part of the specification hereof.

The process consists in the treatment of straw or equivalent fibrous material by a solution of caustic potash or soda, when such alkali has been carefully freed from lime used in rendering it caustic, in such strength and manner as that these, together with other means, hereinafter described, will enable the operator to reduce said fiber to the so-called "pulpy" state, and thereby dispense with a large part of the machinery usually required for such purposes. The process is simple, efficacious, and economical, but requires some precautions in operating it, from the fact that the lime used in rendering the alkali caustic, if not entirely cleared from the liquid before applying it to the straw, will fix instead of removing the color therefrom. Success, therefore, depends very much on the previous preparation of the alkali. The straw contains a native coloring-matter, which is soluble in pure caustic alkali, or is so acted on by the presence of it that the hypochlorite used in bleaching will entirely remove it; but if the lime be at all left in the liquid the native color of the straw is fixed and deepened in proportion to the lime that it (the liquid) may contain, so that the bleaching agent cannot remove it. Soda, being preferred to potash from its cheapness, is rendered caustic by boiling two parts, by weight, with four of lime. The process of mixing, being well known in the art, need not be described. To decide whether the caustic alkaline solution contains an excess of lime, remove a measured portion of the clear caustic alkaline liquor in a graduated glass measure, and prepare a measured portion of the soda-ash, also dissolved in water, and add of the latter solution, a little at a time, to the former solution, (if a precipitate falls;) continue to add till the precipitate ceases. The amount of the soda-ash used compared with the contents of the tub indicates the amount of soda-ash necessary to neutralize the lime which happened to be in excess in the tub.

The first part of the process consists in reducing straw or equivalent fiber to the pulpy state by means of the pure alkali potash or soda freed from lime in the manner hereinafter described.

Secondly. The alkaline liquid is used in a concentrated state as practicable for the purpose of afterward evaporating the mother or waste liquid, to be used for manure or other purposes. The alkaline liquid is also caused to circulate through the mass of fibrous material in such manner as to be many times used over and reheated during the operation.

Thirdly. The fibrous material, after being thus treated by the alkalies and suitably washed, is next treated with the bleaching-liquid, which consists of the hypochlorite of alumina or of lime, or the equivalent thereof. Of these hypochlorites I use about twenty-five per cent., by weight, of the fiber operated on. This will produce a strength of liquor equal to about 3° Baumé, and will correspond to about seventy-five gallons of water to each hundred-weight of the straw used.

To enable others skilled in the art to use the process, I proceed to describe it.

The straw is cut into the proper lengths by any suitable machine, and put into an open tub, A, as shown in the accompanying drawing. The tub has a false bottom corresponding with the horizontal line B B B, the said false bottom being perforated with numerous small holes. The tub is to be covered when the process is proceeding. Through the cover pipe G passes, terminating with a rose-head, I L. The opposite end of the pipe descends into the closed iron vessel E, and nearly to its bottom. In this iron vessel, of the capacity of sixty to seventy gallons, the alkaline solution is to be placed, and by the means of high-pressure steam from a suitable steam-boiler passing through a suitable worm or coil, F, in the iron vessel E, the liquor is boiled, and by a slight escape of steam from the worm is to be forced up through the pipe G and rose-head I L, by which streams of the boiling liquor will be projected down upon the fibrous material in the tub A. As soon as one filling of the iron vessel has been discharged upon the fiber, the iron vessel is again to be filled and discharged in like manner, and the operation is to be repeated till the proper quantity of the alkaline solution shall have been forced into the tub. It is to be understood that while the iron vessel is being filled the steam is shut off therefrom.

When the whole of the liquor required has been forced into the tub, a circulation of the liquid is produced in the following manner: The stop-cock D in the pipe R, hereinafter described, is to be opened and remain open during the discharge of the liquid upon the contents of the tub. From the bottom of tub A, raised a few inches above the top of iron vessel E, proceeds pipe R, with the stop-cock D. This pipe has on its lower end, as it enters the vessel E, a self-acting valve, M, opening into vessel E, by which said vessel is filled with the liquor discharged from the bottom of the tub, the steam being turned off at the same time from vessel E for that purpose. As soon as the tub is discharged, steam is again let into the vessel E, the liquor reheated and again thrown upon the fibrous contents of the tub, as before, and so on till the process has been completed at the end of eight to ten hours. The self-regulating valve M is so arranged that on letting the steam into vessel E the valve closes and prevents the return of any liquid through the bottom of the tub, as is seen by inspection of its construction, the valve being pressed back upon its seat by the pressure of the steam within E. At the close of the circulating operation the stop-cock D is shut, and the liquor drawn off by pipe C at the bottom of tub A. Water is next thrown in upon the contents of the tub, having been first heated in vessel E, in the same manner as vessel E before heated the caustic alkali; but the washing should not proceed beyond the strength of 1° Baumé, or only till the washings are reduced to that strength, as a less strength of washing-liquor will not be worth evaporating. The waste liquor is evaporated to dryness and used over again in the same works, or used as a manure to be spread on the land.

The amount of liquid alkali which experience has shown to be the best, with my special mode of operating the same, is thirty to forty gallons on each hundred-weight of straw, and the best strength is 8° to 10° Baumé.

As to the method used for circulating the liquid, there are various modifications which may be used; but I prefer that which I have given above as productive of the best results.

The whole process above described is based mainly upon the scientific fact that straw boiled in lime-water has its natural color deepened and permanently fixed, while that treated with pure alkali, as of potash or soda, has the color so loosened that hypochlorites will entirely remove it.

In the above specification for a process for making white paper from straw, while I admit that straw has been boiled in lime-water preparatory to being converted into paper-stuff, that it has been treated with common or carbonated alkalies, and that it has been treated with caustic alkali when mixed with lime; it has never been treated with caustic alkali perfectly freed from lime previous to the issue of this patent. Therefore

What I claim as the invention, and desire to secure by Letters Patent, is—

1. Treating straw with pure caustic alkali, (previously freed from lime,) for loosening the color preparatory to the bleaching process, substantially in the manner and for the purpose set forth.

2. The circulation of the caustic fluid through the stock, so as to avail myself of repeated chemical action on the fibrous material, substantially in the manner and for the purpose set forth.

3. In combination with the alkaline treatment of straw as herein described, the use of the hypochlorites as described, and for the purpose set forth.

C. S. BUCHANAN,
*Assignee.*

Witnesses:
GEORGE WOOD,
L. D. GALE.